United States Patent
Kose et al.

(10) Patent No.: US 10,199,651 B2
(45) Date of Patent: Feb. 5, 2019

(54) BINDER COMPOSITION FOR ELECTRODE OF ELECTRIC STORAGE DEVICE

(71) Applicant: JSR CORPORATION, Minato-ku (JP)

(72) Inventors: Osamu Kose, Yokkaichi (JP); Yasuo Matsuki, Yokkaichi (JP); Tomotaka Shinoda, Koto-ku (JP)

(73) Assignee: JSR Corporation, Minato-ku (JP)

( * ) Notice: Subject to any disclaimer, the term of this patent is extended or adjusted under 35 U.S.C. 154(b) by 1248 days.

(21) Appl. No.: 13/905,636

(22) Filed: May 30, 2013

(65) Prior Publication Data

US 2013/0323587 A1    Dec. 5, 2013

(30) Foreign Application Priority Data

May 31, 2012    (JP) ................... 2012-124509

(51) Int. Cl.

| H01M 4/62 | (2006.01) |
|---|---|
| H01M 4/38 | (2006.01) |
| C08G 73/10 | (2006.01) |
| C08L 79/08 | (2006.01) |
| H01M 4/48 | (2010.01) |
| H01M 10/0525 | (2010.01) |

(52) U.S. Cl.
CPC .......... H01M 4/622 (2013.01); C08G 73/105 (2013.01); C08G 73/1042 (2013.01); C08G 73/1064 (2013.01); C08G 73/1071 (2013.01); C08L 79/08 (2013.01); H01M 4/386 (2013.01); H01M 4/483 (2013.01); H01M 10/0525 (2013.01)

(58) Field of Classification Search
CPC ............................ H01M 4/622; C08G 73/1042
See application file for complete search history.

(56) References Cited

U.S. PATENT DOCUMENTS

| 2007/0048609 A1 | 3/2007 | Ueda et al. |
|---|---|---|
| 2009/0087748 A1* | 4/2009 | Choi ................... H01M 10/052 429/231.5 |
| 2009/0162750 A1 | 6/2009 | Kawakami et al. |
| 2010/0055563 A1 | 3/2010 | Nakanishi et al. |
| 2012/0321949 A1 | 12/2012 | Kawakami et al. |
| 2013/0101897 A1 | 4/2013 | Fukui et al. |
| 2013/0171520 A1* | 7/2013 | Nakayama ......... C08G 73/1067 429/211 |

FOREIGN PATENT DOCUMENTS

| JP | 2000-21412 A | 1/2000 |
|---|---|---|
| JP | 2007-95670 A | 4/2007 |
| JP | 2010-97188 A | 4/2010 |
| JP | 2011-192563 A | 9/2011 |
| JP | 2011-204592 A | 10/2011 |
| WO | WO 2012008543 | * 1/2012 |

OTHER PUBLICATIONS

Extended European Search Report dated Jul. 24, 2013 in Patent Application No. 13169627.0.

* cited by examiner

*Primary Examiner* — Ladan Mohaddes
(74) *Attorney, Agent, or Firm* — Oblon, McClelland, Maier & Neustadt, L.L.P.

(57) ABSTRACT

A binder composition for an electrode of an electric storage device is provided. The binder composition comprises (A) at least one polymer selected from the group consisting of polyamic acids and imidized polymers thereof having an imidization rate of 50% or less and (B) water. The ratio Ma/Mb of the content of the polymer (A), Ma (parts by mass), to the content of the water (B), Mb (parts by mass), ranges from 500 to 5,000. The binder composition for an electrode of the present invention provides an electric storage device having a large charge/discharge capacity and a low degree of capacity degradation due to repetition of a charge/discharge cycle.

23 Claims, No Drawings

BINDER COMPOSITION FOR ELECTRODE OF ELECTRIC STORAGE DEVICE

TECHNICAL FIELD

The present invention relates to a binder composition for an electrode of an electric storage device. More specifically, the invention relates to a binder composition for an electrode that provides an electric storage device having a large charge/discharge capacity and a low degree of capacity degradation due to repetition of a charge/discharge cycle.

BACKGROUND ART

An electric storage device providing high voltage and a high energy density is required as a power source for driving electronic equipment. For such a use, for example, lithium-ion secondary cells and lithium-ion capacitors are expected.

The electrode used in an electric storage device is usually produced by applying a composition (slurry for an electrode) comprising an active material and a polymer functioning as an electrode binder onto a current collector surface and drying it. The polymer used as the binder for an electrode is required to have, for example, the following characteristics:
(1) capability of binding active materials to each other and capability of adhering an active material to a current collector;
(2) resistance to friction in winding of the electrode; and
(3) "tolerance to powder falling" so that, fine powder of an active material does not fall from the coating film of an applied and dried composition (hereinafter, also simply referred to as "active material layer") even in the subsequent steps such as cutting.
A polymer satisfying these various demand characteristics can increase the degree of freedom in structural design (e.g., an electrode folding process and an electrode winding radius) of an electric storage device, resulting in achievement of a reduction in size of the device.

It has been known from experience that the degrees of the capability of binding active materials to each other, the capability of adhering an active material to a current collector, and the tolerance to powder falling are approximately proportional to each other. Accordingly, throughout the specification, these characteristics may be comprehensively referred to as "adhesion".

Recently, in order to achieve such demands for a higher output and a higher energy density of an electric storage device, application of a material having a high lithium occlusion capacity as an electrode active material has been investigated. For example, silicon in a form of an intermetallic compound with lithium can reversibly occlude and discharge lithium. The theoretical maximum capacity of this silicon is about 4,200 mAh/g, which is considerably high compared to the theoretical capacity, about 370 mAh/g, of carbon materials conventionally used. Accordingly, the capacity of an electric storage device will be drastically increased by using a silicon material as the negative-electrode active material. However, since silicon materials show large volume changes associated with charge and discharge, when the conventionally used electrode binder material is directly applied to a negative-electrode active material employing a silicon material, the initial adhesion is not maintained to cause a defect of significantly reducing the capacity in association with charge and discharge.

Methods of using polyimide as an electrode binder for holding such a silicon material in an active material layer have been proposed (Japanese Patent Laid-Open Nos. 2007-95670, 2011-192563, and 2011-204592). These technologies are based on a technological thought for preventing the change in volume of a silicon material by restraining the silicon material with the rigid molecular structure of a polyimide. These patent documents describe that the polyimide is generated by applying an electrode-forming slurry comprising a polyamic acid onto a current collector surface to form a coating film and heating the coating film at a high temperature to thermally imidize the polyamic acid. However, the binder utilizing such a polyimide has insufficient adhesion, and therefore the electrode is degraded by repeating charge and discharge and does not exhibit sufficient durability.

SUMMARY OF INVENTION

The present invention was made for overcoming the circumstances described above. An object of the present invention is to provide a binder composition for an electrode that provides an electric storage device having a large charge/discharge capacity and a low degree of capacity degradation due to repetition of a charge/discharge cycle.

The object and the advantages of the present invention are achieved by a binder composition for an electrode of an electric storage device, the binder composition comprising:
(A) at least one polymer selected from the group consisting of polyamic acids and imidized polymers thereof having an imidization rate of 50% or less; and
(B) water, wherein
the ratio Ma/Mb of the content of the polymer (A), Ma (parts by mass), to the content of the water (B), Mb (parts by mass), ranges from 500 to 5,000.

The binder composition for an electrode of the present invention may further comprise (C) at least one compound selected from the group consisting of compounds each having two or more carboxy groups and anhydrides thereof, in addition to the polymer (A) and the water (B).

The binder composition for an electrode of the present invention comprises the polymer (A) and the water (B) as essential ingredients and optionally comprises the compound (C) and is preferably a composition in a solution form comprising these ingredients dissolved in a liquid medium.

DESCRIPTION OF EMBODIMENTS

Preferred embodiments of the present invention will now be described in detail. However, it should be understood that the present invention is not limited to the following embodiments only and encompasses various modifications within the scope not altering the gist of the invention.

1. Binder Composition for an Electrode

The binder composition for an electrode of the present invention comprises at least a polymer (A) and water (B).

1.1 Polymer (A)

The polymer (A) comprised in the binder composition for an electrode of the present invention is at least one polymer selected from the group consisting of polyamic acids and imidized polymers thereof. The polymer serves as a binder in the active material layer constituting an electrode of an electric storage device.

When the polymer (A) comprised in the binder composition for an electrode of the present invention contains an imidized polymer of a polyamic acid, the imidization rate of the imidized polymer is 50% or less and preferably 20% or less. When the imidized polymer comprised in the binder composition for an electrode has an imidization rate within the above-mentioned range, the stability of the slurry for an electrode prepared using the binder composition is not deteriorated, and an electrode exhibiting excellent adhesion and charge-discharge behavior can be produced, and therefore such an imidization rate is preferred. This imidization rate is the proportion of the number of imide ring structures to the sum of the number of amic acid structures and the number of the imide ring structures in a polyamic acid expressed in percentage. The imidization rate of a polyamic acid can be determined by $^1$H-NMR.

A polyamic acid and an imidized polymer thereof can be used together. The polyamic acid and the imidized polymer thereof may be used at any amount as long as the imidization rate of the imidized polymer is within the above-mentioned preferred range.

The polyamic acid can be prepared through a reaction between a tetracarboxylic dianhydride and a diamine. The imidized polymer of a polyamic acid can be prepared by imidization of a part of the amic acid structures of the polyamic acid through dehydration cyclization.

Examples of the tetracarboxylic dianhydride used for synthesizing the polyamic acid in the present invention include aliphatic tetracarboxylic dianhydrides, alicyclic tetracarboxylic dianhydrides, and aromatic tetracarboxylic dianhydrides. As specific examples thereof, examples of the aliphatic tetracarboxylic dianhydride include butanetetracarboxylic dianhydride;

examples of the alicyclic tetracarboxylic dianhydride include 1,2,3,4-cyclobutanetetracarboxylic dianhydride, 2,3,5-tricarboxycyclopentylacetic dianhydride, 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-8-methyl-5-(tetrahydro-2,5-dioxo-3-furanyl)-naphtho[1,2-c]furan-1,3-dione, 3-oxabicyclo[3.2.1]octane-2,4-dione-6-spiro-3'-(tetrahydrofuran-2',5'-dione), 5-(2,5-dioxotetrahydro-3-furanyl)-3-methyl-3-cyclohexene-1,2-dicarboxylic anhydride, 3,5,6-tricarboxy-2-carboxymethylnorbornan-2:3,5:6-dianhydride, 2,4,6,8-tetracarboxybicyclo[3.3.0]octane-2:4,6:8-dianhydride, and 4,9-dioxatricyclo[5.3.1.0$^{2,6}$]undecane-3,5,8,10-tetraone; and examples of the aromatic tetracarboxylic dianhydride include pyromellitic dianhydride, 3,3',4,4'-benzophenonetetracarboxylic dianhydride, and 3,3',4,4'-diphenylsulfonetetracarboxylic dianhydride. As the tetracarboxylic dianhydride, tetracarboxylic dianhydrides described in Japanese Patent Laid-Open No. 2010-97188 can also be used.

The tetracarboxylic dianhydride used for synthesizing the polyamic acid preferably contains an aromatic tetracarboxylic dianhydride among these tetracarboxylic dianhydrides. The tetracarboxylic dianhydride in the present invention preferably consists of aromatic tetracarboxylic dianhydride only or is a mixture consisting of aromatic tetracarboxylic dianhydride and aliphatic tetracarboxylic dianhydride only, from the viewpoint of stability of the binder composition for an electrode of the present invention. When the tetracarboxylic dianhydride is a mixture consisting of aromatic tetracarboxylic dianhydride and aliphatic tetracarboxylic dianhydride, the amount of the aliphatic tetracarboxylic dianhydride is preferably 30% by mol or less, more preferably 20% by mol or less, to the total amount of the tetracarboxylic dianhydride.

Examples of the diamine used for synthesizing the polyamic acid in the present invention include aliphatic diamines, alicyclic diamines, aromatic diamines, and diaminoorganosiloxanes. As specific examples thereof, examples of the aliphatic diamine include 1,1-metaxylenediamine, 1,3-propanediamine, tetramethylenediamine, pentamethylenediamine, and hexamethylenediamine;

examples of the alicyclic diamine include 1,4-diaminocyclohexane, 4,4'-methylenebis(cyclohexylamine), and 1,3-bis(aminomethyl)cyclohexane; and examples of the aromatic diamine include p-phenylenediamine, 4,4'-diaminodiphenylmethane, 4,4'-diaminodiphenylsulfide, 1,5-diaminonaphthalene, 2,2'-dimethyl-4,4'-diaminobiphenyl, 4,4'-diamino-2,2'-bis(trifluoromethyl)biphenyl, 2,7-diaminofluorene, 4,4'-diaminodiphenyl ether, 2,2-bis[4-(4-aminophenoxy)phenyl]propane, 9,9-bis(4-aminophenyl)fluorene, 2,2-bis[4-(4-aminophenoxy)phenyl]hexafluoropropane, 2,2-bis(4-aminophenyl)hexafluoropropane, 4,4'-(p-phenylenediisopropylidene)bisaniline, 4,4'-(m-phenylenediisopropylidene)bisaniline, 1,4-bis(4-aminophenoxy)benzene, 4,4'-bis(4-aminophenoxy)biphenyl, 2,6-diaminopyridine, 3,4-diaminopyridine, 2,4-diaminopyrimidine, 3,6-diaminoacridine, 3,6-diaminocarbazole, N-methyl-3,6-diaminocarbazole, N-ethyl-3,6-diaminocarbazole, N-phenyl-3,6-diaminocarbazole, N,N'-bis(4-aminophenyl)-benzidine, N,N'-bis(4-aminophenyl)-N,N'-dimethylbenzidine, 1,4-bis(4-aminophenyl)-piperazine, and 3,5-diaminobenzoic acid; and examples of the diaminoorganosiloxane include 1,3-bis(3-aminopropyl)-tetramethyldisiloxane. As the diamine, diamines described in Japanese Patent Laid-Open No. 2010-97188 can also be used.

The diamine used for synthesizing the polyamic acid in the present invention preferably contains an aromatic diamine in an amount of 30% by mol or more, more preferably 50% by mol or more, and most preferably 80% by mol or more, based on the total amount of the diamine.

In synthesis of the polyamic acid, an end-modified polymer may be synthesized using an appropriate molecular weight modifier together with the tetracarboxylic dianhydride and the diamine mentioned above.

Examples of the molecular weight modifier include acid monoanhydrides, monoamine compounds, and monoisocyanate compounds. As specific examples thereof, examples of the acid monoanhydride include maleic anhydride, phthalic anhydride, itaconic anhydride, n-decylsuccinic anhydride, n-dodecylsuccinic anhydride, n-tetradecylsuccinic anhydride, and n-hexadecylsuccinic anhydride; examples of the monoamine compounds include aniline, cyclohexylamine, n-butylamine, n-pentylamine, n-hexylamine, n-heptylamine, and n-octylamine; and examples of the monoisocyanate compound include phenylisocyanate and naphthylisocyanate.

The amount of the molecular weight modifier is preferably 20 parts by mass or less, more preferably 10 parts by mass or less, based on 100 parts by mass of the sum of the tetracarboxylic dianhydride and the diamine used.

In the synthetic reaction of the polyamic acid, the tetracarboxylic dianhydride and the diamine are used such that the amount of the acid anhydride group of the tetracarboxylic dianhydride is preferably 0.9 to 1.2 equivalents, more preferably 1.0 to 1.1 equivalents, to 1 equivalent of the amino group of the diamine.

The synthetic reaction of the polyamic acid is preferably performed in an organic solvent at preferably −20 to 150° C. and more preferably 0 to 100° C., for preferably 0.1 to 24 hours and more preferably 0.5 to 12 hours.

Herein, the organic solvent may be any organic solvent that can be usually used in synthetic reaction of a polyamic acid, such as an aprotic polar solvent, phenol or a derivative thereof, an alcohol, a ketone, an ether, an ester, or a hydrocarbon. As specific examples of the organic solvent, examples of the aprotic polar solvent include N-methyl-2-pyrrolidone, N-t-butyl-2-pyrrolidone, N-methoxyethyl-2- pyrrolidone, N,N-dimethylacetamide, N,N-dimethylformamide, dimethylsulfoxide, γ-butyrolactone, tetramethylurea, and hexamethylphosphortriamide;

examples of the phenol derivative include m-cresol, xylenol, and halogenated phenols;

examples of the alcohol include methanol, ethanol, isopropanol, cyclohexanol, ethylene glycol, propylene glycol, 1,4-butanediol, triethylene glycol, and ethylene glycol monomethyl ether;

examples of the ketone include acetone, methyl ethyl ketone, methyl isobutyl ketone, and cyclohexanone;

examples of the ether include ethylene glycol methyl ether, ethylene glycol ethyl ether, ethylene glycol-n-propyl ether, ethylene glycol-i-propyl ether, ethylene glycol-mono-n-butyl ether, ethylene glycol-di-n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, and tetrahydrofuran; examples of the ester include ethyl lactate, butyl lactate, methyl acetate, ethyl acetate, butyl acetate, methyl methoxy propionate, ethyl ethoxy propionate, isoamyl propionate, isoamyl isobutylate, diethyl oxalate, and diethyl malonate; and examples of the hydrocarbon include hexane, heptane, octane, benzene, toluene, and xylene.

The dehydration cyclization reaction of a polyamic acid is preferably performed by heating the polyamic acid or by adding a dehydrating agent and a dehydration cyclization catalyst to a solution of the polyamic acid dissolved in an organic solvent and heating the mixture as necessary.

The reaction temperature in the method of heating the polyamic acid is preferably 180 to 250° C. and more preferably 180 to 220° C. In a reaction temperature of lower than 180° C., the dehydration cyclization reaction may not sufficiently proceed, and in a reaction temperature of higher than 250° C., an imidized polymer having a low molecular weight may be provided. The reaction time in the method of heating the polyamic acid is preferably 0.5 to 20 hours and more preferably 2 to 10 hours.

In the method of adding a dehydrating agent and a dehydration cyclization catalyst to a solution of the polyamic acid, the dehydrating agent can be an acid anhydride such as acetic anhydride, propionic anhydride, or trifluoroacetic anhydride. The amount of the dehydrating agent is preferably 0.01 to 1.0 mol to 1 mol of the amic acid structure of the polyamic acid. The dehydration cyclization catalyst can be a tertiary amine such as pyridine, collidine, lutidine, or triethylamine. The amount of the dehydration cyclization catalyst is preferably 0.01 to 1.0 mol to 1 mol of the dehydrating agent used. Examples of the organic solvent used in the dehydration cyclization reaction include the organic solvents exemplified as those used in synthesis of the polyamic acid. The reaction temperature of the dehydration cyclization reaction is preferably 0 to 180° C. and more preferably 10 to 150° C. The reaction time is preferably 1 to 10 hours and more preferably 2 to 5 hours.

A solution of the thus-prepared polyamic acid or imidized polymer thereof at a concentration of 10% by weight preferably has a solution viscosity of 2,000 to 100,000 mPa·s, more preferably 5,000 to 30,000 mPa·s. The solution viscosity (mPa·s) of the polymer is the value of a solution with a concentration of 10% by weight of the polymer in a good solvent (e.g., γ-butyrolactone or N-methyl-2-pyrrolidone) for the polymer, measured with an E type rotational viscometer at 25° C.

The thus-prepared polyamic acid or imidized polymer thereof preferably has a polystyrene equivalent weight average molecular weight (Mw) of 1,000 to 500,000, more preferably 2,000 to 300,000, as measured by gel permeation chromatography (GPC). Furthermore, the ratio (Mw/Mn) of the Mw to the polystyrene equivalent number average molecular weight (Mn) measured by gel permeation chromatography (GPC) is preferably 15 or less and more preferably 10 or less.

The thus-prepared polyamic acid or imidized compound thereof is, directly or after purification by a known method as necessary, used for preparing a slurry for an electrode described below.

The polyamic acid in the present invention may be a commercially available polyamic acid solution. Examples of the commercially available polyamic acid solution include U-varnish A (manufactured by Ube Industries, Ltd.).

1.2 Water (B)

The binder composition for an electrode of the present invention comprises water (B).

The water in the binder composition for an electrode of the present invention is used in an amount such that the ratio Ma/Mb of the content of the polymer (A), Ma (parts by mass), to the content of the water (B), Mb (parts by mass), in the composition ranges from 500 to 5,000. The ratio Ma/Mb is preferably 1,000 to 5,000 and more preferably 1,300 to 3,500. The use of water within the above-mentioned range enhances the adhesion and improves the electrical properties of the resulting electrode layer.

In the field of electric storage devices, it is conventionally thought that water erodes electrode active materials. Accordingly, it is common knowledge in this field that mixing of water as an impurity into the binder for an electrode during its production is avoided as much as possible. In addition, in the field of polymers, it has been believed that contact of water with a polyamic acid or an imidized polymer thereof hydrolyzes the auric acid structure or the imide ring to reduce the molecular weight.

However, the binder composition for an electrode of the present invention comprises water (B) in a specific proportion to the amount of the polymer (A), and thereby the electric storage device produced using the composition exhibits notably excellent charge-discharge behavior. In particular, this effect is notable in the case of using an active material containing silicon atoms as the electrode active material. Though the mechanism of this effect is unclear, the present inventors have surmised that the effect is caused by the following mechanism.

When an active material layer is formed, a polyamic acid or an imidized polymer thereof approaches atoms of a metal (e.g., Co) or a metalloid (e.g., Si) of the active material surface. It is thought that on this occasion, a metal or metalloid atom and a carboxy group of the polymer (A) bond to each other via a water molecule as shown below to exhibit a strong binder effect. The carboxy group of a polymer (A) may be present at the end of the polymer (A) or may constitute the amic acid structure in the polymer chain:

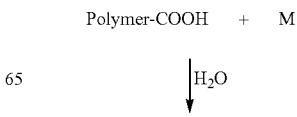

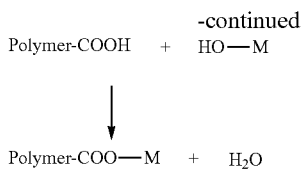

(wherein, "Polymer" represents a polymer chain; and M represents a metal or metalloid atom on an active material surface).

In addition, it has been revealed that the disadvantageous effects that have been concerned about in the field of the art do not occur in the resulting electric storage device, provided that the amount of water used in the binder composition for an electrode is within the range mentioned above. This is an extraordinary fact contrary to the technical knowledge in the field. Probably, the water from the binder composition for an electrode or the water regenerated by bonding of the polymer (A) to a metal or metalloid atom on the active material surface is easily dissipated by the heating preferably performed in the step of forming the active material layer and does not remain in the active material layer.

It is believed that the polymer (A) exhibits the highest binder effect through such a mechanism and that the harmful effect of water on the electrical properties of the active material layer is reduced as much as possible.

The content of water (B) in the binder composition for an electrode of the present invention can be measured with, for example, a Karl Fischer moisture meter.

1.3 Compound (C)

The binder composition for an electrode of the present invention optionally comprises (C) at least one compound selected from the group consisting of compounds each having two or more carboxy groups and anhydrides thereof.

In the case of the binder composition for an electrode of the present invention comprising the compound (C), the electric storage device produced using the composition exhibits notably excellent charge-discharge behavior. Though the mechanism of this effect is unclear, the present inventors have surmised that the effect is caused by the following mechanism.

There are cases when the polymer (A) in the present invention has an amino group (primary amino group) at one end in some cases. This amino group is believed to erode the metal or metalloid atoms on the active material surface. Accordingly, it is concerned that an electric storage device including a polymer having an amino group as a binder deteriorates the charge-discharge behavior with time. Furthermore, the polymer (A) having an amino group at one end cannot form a bond with a metal or metalloid atom on the active material surface even if water intervenes therebetween. Therefore, any strong binder effect as described in the paragraph "1.2 Water (B)" does not occur.

However, in the binder composition for an electrode of the present invention comprising the compound (C), probably, at least one of carboxy groups or an acid anhydride group bonds to the amino group during the heating in the step of forming the active material layer, resulting in generation of a carboxy group or an acid anhydride group on the end of the polymer (A). Therefore, the presence of the compound (C) can prevent the deterioration in the metal or metalloid atoms on the active material surface and allows these atoms to bond to polymer chains, resulting in improvement of the charge-discharge behavior. If the compound (C) has three or more carboxy groups or is an anhydride thereof, a polymer (A) having an amino group at one end can form two bonds with metal or metalloid atoms on the active material surface, which bonding exhibits the effect cumulatively.

From the reasons described above, the compound (C) in the present invention is preferably at least one compound selected from the group consisting of compounds having three or more carboxy groups and anhydrides thereof and more preferably at least one compound selected from the group consisting of compounds having three or four carboxy groups and anhydrides thereof. The compound (C) preferably has a molecular weight of about 40 to 1,000.

The compound (C) in the present invention preferably has a first acid dissociation constant (pKa1) of 2 to 5 at 25° C. This acid dissociation constant can be measured by, for example, a method using a commercially available potentiometric titrator (e.g., product name "COM-980 Win" manufactured by Hiranuma Sangyo Co., Ltd.) or can be searched from, for example, acid dissociation constants described in Handbook of Chemistry (Third revision, edited by The Chemical Society of Japan, Jun. 25, 1984, Maruzen Company, Ltd.) or database "pKaBASE" manufactured by Compudrug Chemistry, Ltd.

As specific examples of the compound (C), examples of the compound having three carboxy groups include trimellitic acid, 1,2,3-tricarboxypropane, monoethyl pyromellitate, monoethyl 3,3',4,4'-biphenyltetracarboxylate, and monoethyl 3,3',4,4'-benzophenonetetracarboxylate;

examples of the compound having four carboxyl groups include pyromellitic acid, 3,3',4,4'-biphenyltetracarboxylic acid, and 3,3',4,4'-benzophenonetetracarboxylic acid and also tetracarboxylic acids prepared by hydration of tetracarboxylic dianhydrides described in Japanese Patent Laid-Open No. 2010-97188; and examples of the anhydride of the compound mentioned above include pyromellitic dianhydride, 3,3',4,4'-biphenyltetracarboxylic dianhydride, and 3,3',4,4'-benzophenonetetracarboxylic dianhydride and also tetracarboxylic dianhydrides described in Japanese Patent Laid-Open No. 2010-97188.

When the compound (C) is at least one selected from the group consisting of compounds each having carboxy groups, preferably three or four carboxy groups, and monoanhydrides thereof, the compound (C) may be used in a salt form. Examples of the counter cation of the salt include lithium, sodium, potassium, cesium, magnesium, calcium, ammonium, and alkyl ammonium ions.

The compound (C) in the binder composition for an electrode of the present invention is preferably at least one selected from the group consisting of compounds each having four carboxy groups in the molecules, salts of the compounds, and dianhydrides of the compounds.

The compound (C) in the binder composition for an electrode of the present invention is used in an amount such that the ratio Ma/Mc of the content of the polymer (A), Ma (parts by mass), to the content of the compound (C), Mc (parts by mass), in the composition is preferably from 50 to 400 and more preferably from 60 to 350. The use of the compound (C) in such a concentration is preferred because such use allows the compound (C) to exhibit its function under gentle conditions and thereby prevents each ingredient from being deteriorated by excessive heating.

The content of the compound (C) in the binder composition for an electrode of the present invention can be measured by, for example, liquid chromatography.

1.4 Liquid Medium

The liquid medium used in the binder composition for an electrode of the present invention is preferably a non-aqueous medium, and specific examples thereof include alcohols such as methanol, ethanol, propanol, isopropanol, butanol, benzyl alcohol, and glycerin;

ketones such as acetone, methyl ethyl ketone, cyclopentanone, and isophorone;

ethers such as methyl ethyl ether, diethyl ether, tetrahydrofuran, and dioxane;

lactones such as γ-butyrolactone and δ-butyrolactone;

lactams such as β-lactam;

linear or cyclic amide compounds such as dimethylformamide, N-methylpyrrolidone, and N,N-dimethylacetamide;

compounds having nitrile groups such as methylene cyanohydrin, ethylene cyanohydrin, 3,3'-thiodipropionitrile, and acetonitrile;

glycol compounds such as ethylene glycol and propylene glycol; and diethylene glycol or its derivatives such as diethylene glycol, diethylene glycol monoethyl ether, and diethylene glycol ethyl butyl ether. These media can be used alone or in combination thereof.

The liquid medium in the binder composition for an electrode of the present invention is used in an amount such that the solid concentration of the binder composition for an electrode (the proportion of the total mass of the ingredients other than the liquid medium in the composition to the total mass of the composition) is preferably 5 to 70% by mass and more preferably 10 to 55% by mass.

1.5 pH of Binder Composition for an Electrode

The binder composition for an electrode of the present invention preferably has a pH of 5 to 9 and more preferably 6 to 7. The pH of the composition can be adjusted with a known acid (excluding those corresponding to compound (C)) or a base. Examples of the acid include hydrochloric acid, nitric acid, sulfuric acid, and phosphoric acid; and examples of the base include sodium hydroxide, potassium hydroxide, lithium hydroxide, and ammonia.

Accordingly, the binder composition for an electrode of the present invention may comprise the acid or base as an optional ingredient in a range necessary for adjusting the pH, in addition to the polymer (A), the water (B), the compound (C), and the liquid medium.

1.6 Method of Preparing Binder Composition for an Electrode

The binder composition for an electrode of the present invention may be prepared by any method, as long as the above-mentioned ingredients are contained.

The binder composition for an electrode of the present invention can be prepared by an appropriate method, such as a process of adding water (B) and optional ingredients to a polymerization mixture prepared by synthesis of the polymer (A); or a process of dissolving a polymer isolated from a polymerization mixture prepared by synthesis of the polymer (A) in a liquid medium together with water (B) and optional ingredients.

The former process is preferred because of its convenience.

2. Slurry for an Electrode

A slurry for an electrode can be produced using the binder composition for an electrode of the present invention described above. The slurry for an electrode is a dispersion that is used for forming an electrode active material layer on a surface of a current collector. The slurry for an electrode in the present invention comprises at least the binder composition for an electrode of the present invention and an electrode active material.

2.1 Electrode Active Material

Examples of the electrode active material comprised in the slurry for an electrode that is produced using the binder composition for an electrode of the present invention include carbon materials, oxides containing lithium atoms, active materials containing silicon atoms, lead compounds, tin compounds, arsenic compounds, antimony compounds, and aluminum compounds.

Examples of the carbon material include amorphous carbon, graphite, natural graphite, meso-carbon microbeads (MCMB), and pitch-based carbon fibers.

Examples of the oxide containing lithium atoms include lithium cobaltate, lithium nickelate, lithium manganate, ternary lithium nickel-cobalt-manganate, $LiFePO_4$, $LiCoPO_4$, $LiMnPO_4$, and $Li_{0.90}Ti_{0.05}Nb_{0.05}Fe_{0.30}Co_{0.30}Mn_{0.30}PO_4$.

Examples of the active material containing silicon atoms include simple substance silicon, silicon oxides, and silicon alloys, and also silicon materials described in Japanese Patent Laid-Open No. 2004-185810. The silicon oxides are preferably those represented by the compositional formula: $SiO_x$ ($0<x<2$, preferably $0.1 \le x \le 1$). The silicon alloys are preferably those composed of silicon and at least one transition metal selected from the group consisting of titanium, zirconium, nickel, copper, iron, and molybdenum. Silicides of these transition metals have high electron conductivity and high strength and therefore preferred. Furthermore, in an active material comprising such a transition metal, the transition metal present on the surface of the active material is oxidized into an oxide having a hydroxy group on the surface, which oxidization enhances the binding capacity with the binder, and such silicon alloys are preferred also from this viewpoint. The silicon alloy is preferably a silicon-nickel alloy or a silicon-titanium alloy, most preferably a silicon-titanium alloy. The content proportion of silicon in the silicon alloy is preferably 10% by mol or more, more preferably 20 to 70% by mol, based on the total metal elements in the alloy. The active material containing silicon atoms may be any of a single crystal, a polycrystal, and an amorphous substance.

When the binder composition for an electrode of the present invention is used for producing the negative electrode of an electric storage device, the active material comprised in the slurry for an electrode is preferably one containing silicon atoms. The lithium occlusion amount per unit weight of silicon atoms is higher than those of other active materials. Accordingly, an electrode active material comprising an active material containing silicon atoms can increase the charging capacity of the resulting electric storage device. Furthermore, as a result, the output and energy density of the electric storage device can be increased. The active material for a negative electrode preferably consists of a mixture of an active material containing silicon atoms and a carbon material. The volume changes of carbon materials associated with charge and discharge are small. Therefore, the influence of volume change of an active material containing silicon atoms can be reduced by using a mixture of the active material containing silicon atoms and a carbon material as the active material for a negative electrode. As a result, the adhesion between the active material layer and the current collector can be enhanced. The active material for a negative electrode most preferably consists of a mixture of an active material containing silicon atoms and graphite.

The proportion of the active material containing silicon atoms based on 100% by mass of the electrode active material is 1% by mass or more, more preferably 1 to 50% by mass, more preferably 5 to 45% by mass, and most preferably 10 to 40% by mass.

The active material preferably has a granular shape. The particle diameter (average median particle diameter) of the granular particles is preferably 0.1 to 100 μm and more preferably 1 to 20 μm.

The active material is used in an amount such that the amount of the polymer (A) in the binder composition for an electrode is preferably 0.1 to 25 parts by mass, more preferably 0.5 to 15 parts by mass, based on 100 parts by mass of the active material. Such an amount allows production of an electrode having more excellent adhesion and lower electrode resistance to exhibit more excellent charge-discharge behavior.

2.2 Other Ingredients

The slurry for an electrode in the present invention may comprise other ingredients, as necessary, in addition to the binder composition for an electrode and the electrode active material. Examples of such optional ingredients include a conductivity-imparting agent, a thickener, and a liquid medium.

2.2.1 Conductivity-Imparting Agent

Specific examples of the conductivity-imparting agent include carbon for lithium-ion secondary batteries. Examples of the carbon include activated charcoal, acetylene black, Ketjen black, furnace black, graphite, carbon fibers, and fullerene. Among them, acetylene black and Ketjen black are preferred. The proportion of the conductivity-imparting agent is preferably 20 parts by mass or less, more preferably 1 to 15 parts by mass, and most preferably 2 to 10 parts by mass based on 100 parts by mass of the active material.

2.2.2 Thickener

The slurry for an electrode can comprise a thickener from the viewpoint of improving the application properties. Specific examples of the thickener include cellulose derivatives such as carboxymethyl cellulose, methyl cellulose, ethyl cellulose, hydroxymethyl cellulose, hydroxypropylmethyl cellulose, and hydroxyethyl methyl cellulose;
ammonium salts and alkali metal salts of the cellulose derivatives;
polycarboxylic acids such as poly(meth)acrylic acid and modified poly(meth)acrylic acid;
alkali metal salts of the polycarboxylic acids;
polyvinyl alcohol based (co)polymers such as polyvinyl alcohol, modified polyvinyl alcohol, and ethylene-vinyl alcohol copolymers; and
water-soluble polymers, for example, saponified copolymers of vinyl esters and unsaturated carboxylic acids such as (meth)acrylic acid, maleic acid, or fumaric acid.

The thickener is used in an amount such that the ratio Wv/Wa of the weight, Wv, of the thickener to the weight, Wa, of the active material in the slurry for an electrode is preferably 0.001 to 0.1 and more preferably 0.005 to 0.05.

2.2.3 Liquid Medium

The slurry for an electrode comprises the binder composition for an electrode and therefore comprises the liquid medium contained in the binder composition for an electrode. However, the slurry for an electrode may further comprise a liquid medium in addition to the liquid medium from the binder composition for an electrode.

The liquid medium further added to the slurry for an electrode may be the same as or different from the liquid medium contained in the binder composition for an electrode and is preferably selected from liquid media that have been described as those in the binder composition for an electrode.

The liquid medium in the slurry for an electrode (including that from the binder composition for an electrode) is used in an amount such that the solid concentration of the slurry for an electrode (the proportion of the total mass of the ingredients other than the liquid medium in the slurry for an electrode to the total mass of the slurry, the same shall apply hereinafter) is preferably 30 to 70% by mass and more preferably 40 to 60% by mass.

2.3 Method of Producing Slurry for an Electrode

The slurry for an electrode may be produced by any method as long as the slurry comprises the above-described ingredients.

However, from the viewpoint of producing a slurry for an electrode having better dispersibility and stability more efficiently and inexpensively, the slurry can be produced by adding the active materials and optional ingredients to the binder composition for an electrode and mixing these ingredients.

The binder composition for an electrode and other ingredients are stirred by a known procedure and can thereby be mixed.

At least part of the process of preparing the slurry for an electrode (operation of mixing each ingredient) is preferably performed under reduced pressure to prevent occurrence of air bubbles in the resulting positive-electrode layer. The degree of reduction in pressure is preferably about $5.0 \times 10^4$ to $5.0 \times 10^5$ Pa as absolute pressure.

Mixing and stirring for producing the slurry for an electrode should be performed with a mixer that can stir the ingredients such that no aggregate of the active material particles remains in the slurry by selecting necessary and sufficient conditions. The degree of dispersion can be measured with a particle gauge. Mixing and dispersing are preferably performed at least such that no aggregate having a size larger than 100 μm remains. Examples of the mixer satisfying such requirements include a ball mill, a bead mill, a sand mill, a deaerator, a color mill, a Raikai mixer, an ultrasonic disperser, a homogenizer, a planetary mixer, and a Hobart mixer.

3. Method of Producing Electrode for an Electric Storage Device

An electrode for an electric storage device can be produced using the slurry for an electrode described above.

The electrode for an electric storage device is produced by applying a slurry for an electrode prepared using the binder composition for an electrode of the present invention onto a surface of an appropriate current collector such as metal foil to form a coating film and then removing the liquid medium from the coating film. The thus-produced electrode is composed of the current collector and an active material layer binding thereon, wherein the active material layer comprises the polymer (A), the active material, and optional ingredients as necessary. It is believed that the water (B) contained in the binder composition for an electrode and the slurry for an electrode are removed during the step of removing the liquid medium, and the concentration of the remaining water in the resulting active material layer is low.

In the electrode having a layer, on the surface of the current collector, formed from the slurry for an electrode prepared using the binder composition for an electrode of the present invention, the binding capacity between the current collector and the active material layer is excellent, and the degree of deterioration in charge/discharge capacity by repetition of a charge/discharge cycle is low.

3.1 Current Collector

The current collector may be composed of any electrically conductive material without specific limitation. In a lithium ion secondary battery, a current collector made of a metal such as iron, copper, aluminum, nickel, or stainless steel is used. In a lithium ion secondary battery, in particular, a battery having a positive electrode of aluminum and a negative electrode of copper, the effect of the slurry for a positive electrode of the present invention is the highest. In a nickel-hydrogen secondary battery, as the current collect, for example, a punching metal, an expanded metal, wire gauze, a foam metal, a mesh-like metal fiber sintered compact, or a metal plated resin plate is used.

The current collector may have any shape and any thickness. The thickness of the current collector is preferably 1 to 500 µm, more preferably 5 to 150 µm, and most preferably 10 to 50 µm. The shape of the current collector is preferably sheet like.

3.2 Method of Forming Electrode for Electric Storage Device

The electrode for an electric storage device of the present invention can be produced by forming an active material layer on a current collector through a process of applying a slurry for an electrode comprising at least an active material and a binder composition for an electrode on a current collector to form a coating film and then heating the coating film to remove the dispersion medium from the coating film. It is believed that water is also removed in the step of removing the dispersion medium.

The application of the slurry for an electrode onto the current collector may be performed by any method and can be performed by an appropriate method such as a doctor blade method, a dipping method, a reverse roll method, a direct roll method, a gravure method, an extrusion method, an immersion method, or a brush coating method. The slurry for an electrode may be applied at any amount, and the amount is such that the thickness of the active material layer formed after the removal of the liquid medium is preferably 5 to 250 µm and more preferably 20 to 100 µm.

The liquid medium may be removed by any method from the applied coating film and can be removed by, for example, drying with warm air, hot air, or low humidity air; vacuum drying; or irradiation with (far) infrared rays, electron rays and the like. The drying rate can be appropriately determined such that the liquid medium can be removed as fast as possible without causing cracking due to stress concentration in the active material layer and peeling of the active material layer from the current collector.

The heating temperature is preferably in a range such that the amic acid structure possessed by the binder composition for an electrode in the coating film is not completely thermally imidized. From this requirement, the heating temperature in the step of removing the dispersion medium is preferably not higher than 150° C. and more preferably not higher than 130° C. The heating time is preferably 0.5 to 30 minutes and more preferably 1 to 15 minutes.

Furthermore, the density of the active material layer is preferably increased by pressing the current collector after the removal of the liquid medium. The pressing may be performed by, for example, mold press or roll press. The conditions for the pressing should be appropriately determined depending on the type of the press tool used and the desired density value of the active material layer. These conditions can be easily determined through a small amount of preliminary experiments by a person skilled in the art. For example, roll pressing can be performed with either a gap roller or a press roller at a linear pressure of 0.1 to 10 t/cm, preferably 0.5 to 5 t/cm, at a roll temperature of 20 to 100° C., and with a feed rate (rotation speed of the roll) of the coating film after removal of the dispersion medium of 1 to 80 m/min, preferably 5 to 50 m/min.

The density of the active material layer after the pressing is, when the electrode is used as a positive electrode, preferably 1.5 to 2.4 $g/cm^3$ and more preferably 1.7 to 2.2 $g/cm^3$; and when the electrode is used as a negative electrode, preferably 1.2 to 1.9 $g/cm^3$ and more preferably 1.3 to 1.8 $g/cm^3$.

The coating film after the pressing is preferably further heated under reduced pressure to completely remove the liquid medium. The degree of reduction in pressure on this occasion is preferably 50 to 200 Pa and more preferably 75 to 150 Pa as absolute pressure. The heating temperature is preferably in a range such that the polyamic acid structure in the binder composition for an electrode is not completely thermally imidized and is preferably 100 to 300° C. and more preferably 150 to 200° C. The heating time is preferably 2 to 12 hours and more preferably 4 to 8 hours.

The process temperature in each step for forming the active material layer from the slurry for an electrode on the current collector is preferably 200° C. or less and more preferably 180° C. or less. Herein, the steps for forming the active material layer include all steps that are performed by a person skilled in the art for forming an active material layer, such as the step of applying the slurry for an electrode, the step of removing the dispersion medium from the coating film, and optional steps of pressing, heating under reduced pressure, and pressing. The process temperature refers to the temperature of the slurry for an electrode, the current collector, or the active material layer itself, the temperature of the atmosphere surrounding them, and the temperature of the device and the tool being in contact with or near them.

In the thus-produced electrode for an electric storage device, the adhesion between the current collector and the active material layer is excellent, and the cycling characteristic as an example of electric characteristics is satisfactory.

4. Electric Storage Device

An electric storage device can be produced using the electrode for an electric storage device of the present invention described above.

The electric storage device comprises the above-described electrode and also an electrolytic solution and can be produced in accordance with a common method using components such as a separator. Specific examples of the producing process include the steps of disposing a negative electrode and a positive electrode having a separator therebetween, rolling or folding these electrodes depending on the battery shape and putting them in a battery container, and injecting an electrolytic solution into the battery container and sealing the container. The shape of the battery may be any shape such as a coin type, a cylindrical type, a square shape, or a laminate type.

The electrolytic solution may be a liquid or gel and may be selected depending on the kinds of the negative-electrode active material and the positive-electrode active material from known electrolytic solutions that are used in electric storage devices such that the function as a battery is effectively exhibited.

The electrolytic solution can be a solution of an electrolyte dissolved in an appropriate solvent.

The electrolyte may be any known lithium salt that has been conventionally used in, for example, a lithium ion secondary battery, and specific examples thereof include $LiClO_4$, $LiBF_4$, $LiPF_6$, $LiCF_3CO_2$, $LiAsF_6$, $LiSbF_6$, $LiB_{10}Cl_{10}$, $LiAlCl_4$, LiCl, LiBr, $LiB(C_2H_5)_4$, $LiCF_3SO_3$, $LiCH_3SO_3$, $LiC_4F_9SO_3$, $Li(CF_3SO_2)_2N$, and lithium carboxylate of lower fatty acid.

The solvent for dissolving the electrolyte may be any solvent, and specific examples thereof include carbonate compounds such as propylene carbonate, ethylene carbonate, butylene carbonate, dimethyl carbonate, methyl ethyl carbonate, diethyl carbonate, and fluoroethylene carbonate; lactone compounds such as γ-butyrolactone; ether compounds such as trimethoxymethane, 1,2-dimethoxyethane, diethyl ether, 2-ethoxyethane, tetrahydrofuran, and 2-methyl tetrahydrofuran; and sulfoxide compounds such as dimethylsulfoxide. These solvents can be used alone or in combination thereof.

The concentration of the electrolyte in the electrolytic solution is preferably 0.5 to 3.0 mol/L and more preferably 0.7 to 2.0 mol/L.

EXAMPLES

The present invention will now be specifically described based on examples, but is not limited to these examples.

The solution viscosity of a polymer solution, the content of water (B) in a binder composition, and the content of compound (C) in a binder composition in the following examples were respectively measured as follows.

<Solution Viscosity of Polymer Solution>

The solution viscosity of the polymer solution prepared in each synthesis example was measured at 25° C. with an E type rotational viscometer.

<Content of Water (B) in Binder Composition>

The content of water (B) in the binder composition prepared in each Example or Comparative Example was measured with a Karl Fischer moisture meter (manufactured by Mitsubishi Chemical Corporation, model "CA-100").

<Content of Compound (C) in Binder Composition>

The content of compound (C) in the binder composition prepared in each Example or Comparative Example was measured by liquid chromatography under the following conditions:

Measuring apparatus: HLC-8220 (manufactured by Tosoh Corporation)
Degasser: SD-8000
Detector: UV8020 (ultraviolet absorption type detector)
Column: TSKGEL α-M and α-2500 (both are manufactured by Tosoh Corporation) connected in series
Developing solvent: dimethylformamide solution containing 30 mmol/L of LiBr and 10 mmol/L of $H_3PO_4$
Flow rate: 1 mL/min.

Synthesis of Polymer

Synthesis Example 1

A 3-L flask equipped with a stirrer, a thermometer, and a condenser was heated with a heat gun under reduced pressure to remove the residual moisture inside the flask and was then filled with a dry nitrogen gas. This flask was charged with 1,170 g of N-methyl-2-pyrrolidone (NMP) as a solvent dehydrated in advance by dehydration distillation using calcium hydride, 80.56 g (0.250 mol) of 3,3',4,4'-benzophenonetetracarboxylic dianhydride as a tetracarboxylic dianhydride, and 50.06 g (0.250 mol) of 4,4'-diaminodiphenyl ether as a diamine, followed by reaction with stirring at 25° C. for 3 hours to prepare a polymer solution containing 10% by mass of polyamic acid P1.

The solution viscosity of this polymer solution was 12,000 mPa·s.

Synthesis Example 2

A polymer solution containing 10% by mass of polyamic acid P2 was prepared as in Synthesis Example 1 except that the amount of NMP as the solvent was 1,059 g, the tetracarboxylic dianhydride was 40.28 g (0.125 mol) of 3,3',4,4'-benzophenonetetracarboxylic dianhydride and 27.27 g (0.125 mol) of pyromellitic dianhydride, and the diamine was 50.06 g (0.250 mol) of 4,4'-diaminodiphenyl ether.

The solution viscosity of this polymer solution was 10,800 mPa·s.

Synthesis Example 3

A polymer solution containing 10% by mass of polyamic acid P3 was prepared as in Synthesis Example 1 except that the amount of NMP as the solvent was 942 g, the tetracarboxylic dianhydride was 54.53 g (0.250 mol) of pyromellitic dianhydride, and the diamine was 50.06 g (0.250 mol) of 4,4'-diaminodiphenyl ether.

The solution viscosity of this polymer solution was 11,500 mPa·s.

Synthesis Example 4

A polymer solution containing 10% by mass of polyamic acid P4 was prepared as in Synthesis Example 1 except that the solvent was 1,257 g of γ-butyrolactone (GBL), the tetracarboxylic dianhydride was 89.57 g (0.250 mol) of 3,3'4,4'-diphenylsulfonetetracarboxylic dianhydride, and the diamine was 50.06 g (0.250 mol) of 4,4'-diaminodiphenyl ether.

The solution viscosity of this polymer solution was 9,800 mPa·s.

Synthesis Example 5

A polymer solution (1,300 g) containing 10% by mass of polyamic acid was prepared as in Synthesis Example 1.

To this polymer solution were added 3.96 g of pyridine and 5.11 g of acetic anhydride, followed by imidization with stirring at 110° C. for 4 hours.

The resulting reaction solution was added to methanol for reprecipitation to yield imidized polymer P5 of polyamic acid as a white solid. The resulting imidized polymer acid was dissolved in NMP at a concentration of 10% by mass to yield a polymer solution.

The solution viscosity of this polymer solution was 8,200 mPa·s, and the imidization rate of polymer P5 contained in the polymer solution was 20%.

The imidization rate was determined from a $^1$H-NMR chart of the polymer, obtained by removing the solvent from the resulting polymer solution under reduced pressure, dissolving the collected polymer in deuterated dimethylsulfoxide, and measuring using tetramethylsilane as a reference material at room temperature, based on the following equation (1):

$$\text{Imidization rate } (\%) = (1 - A1/A2 \times \alpha) \times 100 \quad (1)$$

(wherein, A1 represents the peak area derived from the proton of NH group appearing near a chemical shift of 10 ppm; A2 represents the peak area derived from other protons; and α represents the number ratio of the other protons to one proton of NH group in the polyamic acid as a precursor of the imidized polymer).

Synthesis Example 6

A polymer solution containing 10% by mass of polyamic acid P6 was prepared as in Synthesis Example 1 except that the tetracarboxylic dianhydride was 80.56 g (0.250 mol) of 3,3',4,4'-benzophenonetetracarboxylic dianhydride, and the diamine was 49.86 g (0.249 mol) of 4,4'-diaminodiphenyl ether.

The solution viscosity of this polymer solution was 9,000 mPa·s.

Synthesis Example 7

A polymer solution containing 10% by mass of polyamic acid P7 was prepared as in Synthesis Example 1 except that the tetracarboxylic dianhydride was 80.24 g (0.249 mol) of 3,3',4,4'-benzophenonetetracarboxylic dianhydride, and the diamine was 50.06 g (0.250 mol) of 4,4'-diaminodiphenyl ether.

The solution viscosity of this polymer solution was 8,000 mPa·s.

Synthesis of Active Material

Synthesis Example 8

A mixture of carbon powder (average particle diameter: 35 μm) and a pulverized silicon dioxide powder (average particle diameter: 10 μm) was heated in an electric furnace controlled to a temperature range of 1,100 to 1,600° C. under a nitrogen gas flow (0.5 NL/min) for 10 hours to yield a powder (average particle diameter: 8 μm) of silicon oxide represented by the compositional formula: $SiO_x$ (x=0.5 to 1.1).

This silicon oxide powder (300 g) was charged in a batch type heating furnace and was heated at a temperature-increasing rate of 300° C./h from room temperature (25° C.) to 1,100° C. while a reduced absolute pressure of 100 Pa being maintained with a vacuum pump. Subsequently, heat treatment (graphite coating treatment) was performed at 1,100° C. for 5 hours while the pressure in the heating furnace was kept at 2,000 Pa and a methane gas was introduced at a flow rate of 0.5 NL/min. After completion of the graphite coating treatment, the temperature was reduced to room temperature at a temperature-decreasing rate of 50° C./h to yield about 330 g of a powder of graphite-coated silicon oxide.

This graphite-coated silicon oxide is an electrically conductive powder (active material) of silicon oxide having surface coated with graphite and has an average particle diameter of 10.5 μm. The proportion of the graphite is 2% by mass based on 100% by mass of the total resulting graphite-coated silicon oxide.

Example 1

(1) Preparation of Binder Composition

A binder composition was prepared by adding 2 μL of water to 100 g of the polymer solution containing polyamic acid P1 (containing 10 g of polyamic acid P1) prepared in Synthesis Example 1 serving as polymer (A) using a microsyringe in a glove box substituted with Ar.

The content of water in this binder composition measured by the method described above was 0.003 parts by mass based on 100 parts by mass of the binder composition.

(2) Adhesion Test of Binder Composition

The binder composition prepared above was applied onto a copper plate and a glass plate each of 10 cm square such that the thickness after removal of the solvent was 90 μm, followed by heating at 150° C. for 15 minutes to form a thin film of the binder on each of the copper plate and the glass plate.

The two binder thin films (polymer films) formed in the above were subjected to a cross-cut adhesion test in accordance with JIS K5400.

Specifically, each thin film was divided into grid-like 100 squares by 11 lines of cuts having a depth reaching from the surface of the thin film to the copper plate or the glass plate formed at intervals of 1 mm using a cutter in each of the length and the width directions. Adhesive tape (manufactured by Teraoka Corporation, product No. "650S") was attached to the entire surface of the 100 squares and was immediately detached, and the number of remaining squares was counted.

The evaluation results are shown in Table 1 as the number of remained squares in the 100 squares.

Incidentally, the present inventors have empirically revealed through investigation that the adhesion between an active material layer and a current collector is proportional to the adhesion between the copper plate and the polymer film in this test. In addition, it has been empirically revealed that the binding capacity as a binder for binding active materials to each other is proportional to the adhesion between the glass plate and the polymer film in this test. Accordingly, a satisfactory adhesion between the glass plate and the polymer film gives presumption that the adhesion of the polymer as a binder for binding active materials to each other is satisfactory; and a satisfactory adhesion between the copper plate and the polymer film gives presumption that the adhesion between a current collector and an active material layer is satisfactory. In this case, when the number of remaining squares is less than 80, the adhesion is judged to be poor;

when the number of remaining squares is 80 or more, the adhesion is judged to be good; and when the number of remaining squares is 90 or more, the adhesion is judged to be excellent. The number of remaining squares is most preferably 100 in the grid-like 100 squares.

(3) Preparation of Slurry for an Electrode

In a twin-screw planetary mixer (manufactured by PRIMIX Corporation, trade name "TK HIVIS MIX 2P-03"), 80 parts by mass (in terms of solid content) of graphite having an average particle diameter of 22 μm (manufactured by Hitachi Chemical Co., Ltd., product name: "SMG-HE1") and 20 parts by mass of graphite-coated silicon oxide prepared in Synthesis Example 8 as negative-electrode active materials, and 1 part by mass of acetylene black (manufactured by Denki Kagaku Kougyo Kabushiki Kaisya, trade name "Denka Black 50% press Compressed") as a conductivity-imparting agent were charged, followed by mixing at 20 rpm for 3 minutes. Subsequently, 100 parts by mass of the binder composition prepared above and 20 parts by mass of NMP were further charged, followed by stirring at 60 rpm for 1 hour.

Subsequently, the mixture was stirred with a stirring deaerator (manufactured by THINKY CORPORATION, trade name "ARV930-TWIN") at 600 rpm under a reduced absolute pressure of 25 kPa for 5 minutes to prepare a slurry for an electrode.

(4) Production of Electrode for Electric Storage Device

The slurry for an electrode prepared in "(3) Preparation of slurry for an electrode" above was uniformly applied onto the surface of a current collector made of copper foil with a 10 μm thickness by a doctor blade method at a thickness such that the mass of the active material layer after removal of the solvent was 4.50 mg/cm$^2$, followed by drying at 120° C. for 5 minutes to form a coating film. Subsequently, the coating film was pressed with a gap distance adjustable roll press (manufactured by Tester Sangyo Co., Ltd., trade name "SA-601") under conditions at a roll temperature of 30° C., a linear pressure of 1 t/cm, and a feeding speed of 0.5 m/min to adjust the density of the electrode layer to 1.60 g/cm$^3$. Furthermore, the coating film was heated at 160° C. under a reduced absolute pressure of 100 Pa for 6 hours to be formed into an active material layer and thereby to provide an electrode for an electric storage device.

The active material layer in the electrode for an electric storage device had a density of 1.62 g/cm$^3$.

(5) Production of Electric Storage Device

An electrode having a diameter of 15.5 mm was produced by punching molding of the electrode produced in "(4) Production of electrode for electric storage device" in a glove box substituted with argon so that the dew point was −80° C. or less, and the resulting electrode was placed on a bipolar coin cell (manufactured by Hohsen Corporation, trade name "HS Flat Cell") such that the active material layer was the upper side. Subsequently, a separator (manufactured by Celgard, trade name "Celgard #2400") made of a polypropylene porous film punched out having a diameter of 24 mm was placed on the electrode, 500 μL of an electrolytic solution was injected such that air was not contained, and then lithium foil having a thickness of 200 μm and a diameter of 16.6 mm was produced by punching molding and placed as a counter electrode. Subsequently, the exterior body of the bipolar coin cell was clamped with screws and sealed to assemble a lithium ion battery cell (electric storage device).

The electrolytic solution used here is a solution prepared by dissolving LiPF$_6$ in a solvent mixture of ethylene carbonate/ethyl methyl carbonate=1/1 (mass ratio) at a concentration of 1 mol/L.

The same procedure was repeated, and two electric storage devices in total were produced. One was used for "(6) Evaluation of electric storage device (evaluation of charge/discharge cycle characteristics)", and the other was used for "(7) Evaluation of rate of change in active material layer thickness".

(6) Evaluation of Electric Storage Device (Evaluation of Charge/Discharge Cycle Characteristics)

Charge of the electric storage device produced in "(5) Production of electric storage device" was started at a constant current (0.2 C); when the voltage reached 0.01 V, the charge was continued at a constant voltage (0.01 V); and when the current value reached 0.05 C, the charge was completed (cut off). Subsequently, discharge was started at a constant current (0.2 C); and when the voltage reached 2.0 V, the discharge was completed (cut off). Thus, the first charge/discharge was concluded.

Then, charge/discharge at 0.5 C was performed using the electric storage device subjected to the first charge/discharge.

First, charge was started at a constant current (0.5 C); when the voltage reached 0.01 V, the charge was continued at a constant voltage (0.01 V); and when the current value reached 0.05 C, the charge was completed (cut off). Subsequently, discharge was started at a constant current (0.2 C); when the voltage reached 2.0 V, the discharge was completed (cut off); and the discharge capacity at 0.5 C (discharge capacity at 0.5 C in the first cycle=A) was measured.

This charge/discharge at 0.5 C was repeated, and the discharge capacity B at 0.5 C in the 100th cycle was measured. The capacity retention after 100 cycles was calculated by the following equation (2):

$$\text{Capacity retention (\%)} = B/A \times 100 \qquad (2).$$

The evaluation results are shown in Table 1.

When the capacity retention after 100 cycles is 90% or more and less than 95%, the charge/discharge cycle characteristics are judged to be excellent; and when the capacity retention is 95% or more, the charge/discharge cycle characteristics are judged to be considerably excellent.

(7) Evaluation of Rate of Change in Active Material Layer Thickness

Charge of the electric storage device produced in "(5) Production of electric storage device" was started at a constant current (0.2 C); when the voltage reached 0.01 V, the charge was continued at a constant voltage (0.01 V); and when the current value reached 0.05 C, the charge was completed (cut off). Subsequently, discharge was started at a constant current (0.2 C); and when the voltage reached 2.0 V, the discharge was completed (cut off). Thus, the first charge/discharge was concluded.

Then, charge of the electric storage device subjected to the first charge/discharge was started at a constant current (0.2 C); when the voltage reached 0.01 V, the charge was continued at a constant voltage (0.01 V); and when the current value reached 0.05 C, the charge was completed (cut off).

This electric storage device was disassembled in a dry room (room temperature: 25° C.) of which dew point was −60° C. or less, and the electrode (negative electrode) for the electric storage device was taken out. Subsequently, the electrode was washed through immersion in dimethyl carbonate for 1 minute in this dry room. The electrode taken out from the dimethyl carbonate was left to stand in the dry room for 30 minutes to remove the dimethyl carbonate by vaporization.

The thickness of the active material layer of this electrode after charging was measured. The ratio of the active material layer thickness of the electrode after charging to the active material layer thickness of the electrode (uncharged state) immediately after the production measured in advance was calculated by the following equation (3):

$$\text{Ratio of film thickness after charging (\%)} = (\text{thickness after charging})/(\text{thickness immediately after production}) \times 100 \qquad (3).$$

The evaluation results are shown in Table 1.

When this value is higher than 120%, the volume expansion of the active material due to charging is not reduced in the active material layer, and it is concerned that the active material is detached due to mechanical stress applied to the active material. In contrast, when this value is 120% or less, regardless of volume expansion of the active material due to charging, the active material is strongly retained in the active material layer and is judged to be well prevented from detaching.

Examples 2 and 3 and Comparative Examples 1 and 2

Binder compositions were prepared as in Example 1 except that the polymer solution (concentration: 10% by mass) prepared in any one of Synthesis Examples 1 to 3 in an NMP solution was used such that the kind and the amount of polymer (A) were as shown in Table 1 and that the amount (charged amount) of water (B) was as shown in Table 1.

A slurry for an electrode was prepared as in Example 1 using each binder composition, and electric storage devices were produced and were evaluated.

The evaluation results are shown in Table 1.

Examples 4 to 7 and 9 to 11 and Comparative Examples 3 to 6

Binder compositions were prepared as in Example 1 except that a polymer solution (concentration: 10% by mass) prepared in any one of Synthesis Examples 1 to 7 was used such that the kind and the amount of polymer (A) were as shown in Table 1; that the amount (charged amount) of water (B) was as shown in Table 1; and that the type and the amount of compound (C) were as shown in Table 1. Herein, the solvents in Examples 4, 6, and 9 to 11 and Comparative Examples 3 to 6 were NMP, and solvents in Examples 5 and 7 were GBL.

A slurry for an electrode was prepared as in Example 1 using each binder composition, and electric storage devices were produced and were evaluated.

The evaluation results are shown in Table 1.

Example 8 and Comparative Example 7

As polymer (A), a commercially available polyamic acid (manufactured by Ube Industries, Ltd., trade name "U-Varnish A", an NMP solution of polyamic acid) was used.

U-Varnish A was dropwise added to methanol with stirring to solidify the polyamic acid. The solidified polyamic acid was dried under a reduced absolute pressure of 4 kPa at 25° C. for 5 hours. The dried polyamic acid (10 g) was dissolved in NMP at a concentration of 10% by mass. Water (B) was added thereto in an amount shown in Table 1, and an NMP solution containing 10% by mass of pyromellitic acid as compound (C) was further added thereto such that the amount of the pyromellitic acid contained in the solution was as shown in Table 1 to prepare each binder composition.

A slurry for an electrode was prepared as in Example 1 using each binder composition, and electric storage devices were produced and were evaluated.

The evaluation results are shown in Table 1.

TABLE 1

| | | | | Example 1 | Example 2 | Example 3 |
|---|---|---|---|---|---|---|
| Slurry for electrode | Binder composition | Polymer (A) | Kind | P1 | P2 | P3 |
| | | | Ma (parts by mass) | 10 | 10 | 10 |
| | | Water (B) | Charged amount (parts by mass) | 0.002 | 0.002 | 0.002 |
| | | | Actual value (in terms of parts by mass) | 0.0030 | 0.0022 | 0.0021 |
| | | Component (C) | Kind | — | — | — |
| | | | Charged amount (parts by mass) | 0 | 0 | 0 |
| | | | Actual value (in terms of parts by mass) | — | — | — |
| | | Ma/Mb (actual value basis) | | 3333 | 4545 | 4762 |
| | | Ma/Mc (actual value basis) | | — | — | — |
| | | Adhesion | Cu plate | 100/100 | 100/100 | 100/100 |
| | | | Glass plate | 100/100 | 100/100 | 100/100 |
| | Active material | C/SiO (parts by mass) | | 20 | 20 | 35 |
| | | Graphite (parts by mass) | | 80 | 80 | 65 |
| Electrode | | Electrode amount (mg/cm$^2$) | | 4.45 | 4.68 | 4.55 |
| | | Electrode density (g/cm$^3$) | | 1.62 | 1.60 | 1.59 |
| Electric storage device | | Discharge capacity retention rate (%) after 100 cycles | | 91 | 90 | 90 |
| | | Active material layer thickness ratio (%) after charging | | 118 | 119 | 120 |

| | | | | Example 4 | Example 5 | Example 6 |
|---|---|---|---|---|---|---|
| Slurry for electrode | Binder composition | Polymer (A) | Kind | P1 | P4 | P5 |
| | | | Ma (parts by mass) | 10 | 10 | 13 |
| | | Water (B) | Charged amount (parts by mass) | 0.003 | 0.004 | 0.003 |
| | | | Actual value (in terms of parts by mass) | 0.0036 | 0.0045 | 0.0040 |
| | | Component (C) | Kind | C3 | C4-1 | C4-2 |
| | | | Charged amount (parts by mass) | 0.15 | 0.03 | 0.1 |
| | | | Actual value (in terms of parts by mass) | 0.14 | 0.03 | 0.08 |
| | | Ma/Mb (actual value basis) | | 2778 | 2222 | 3250 |
| | | Ma/Mc (actual value basis) | | 71 | 334 | 170 |
| | | Adhesion | Cu plate | 100/100 | 100/100 | 100/100 |
| | | | Glass plate | 100/100 | 100/100 | 100/100 |

TABLE 1-continued

|  |  |  |  |  |  |  |
|---|---|---|---|---|---|---|
| Electrode | Active material | C/SiO (parts by mass) |  | 30 | 20 | 15 |
|  |  | Graphite (parts by mass) |  | 70 | 80 | 85 |
|  | Electrode amount (mg/cm$^3$) |  |  | 4.62 | 4.66 | 4.39 |
|  | Electrode density (g/cm$^3$) |  |  | 1.62 | 1.61 | 1.63 |
| Electric storage device | Discharge capacity retention rate (%) after 100 cycles |  |  | 95 | 96 | 94 |
|  | Active material layer thickness ratio (%) after charging |  |  | 115 | 117 | 116 |

Compositions and evaluation results (3/6)

|  |  |  |  | Example 7 | Example 8 | Example 9 |
|---|---|---|---|---|---|---|
| Slurry for electrode | Binder composition | Polymer (A) | Kind | P4 | UVA | P1 |
|  |  |  | Ma (parts by mass) | 15 | 10 | 10 |
|  |  | Water (B) | Charged amount (parts by mass) | 0.010 | 0.005 | 0.003 |
|  |  |  | Actual value (in terms of parts by mass) | 0.0106 | 0.0051 | 0.0032 |
|  |  | Component (C) | Kind | C4-2 | C4-1 | C4-3 |
|  |  |  | Charged amount (parts by mass) | 0.2 | 0.1 | 0.15 |
|  |  |  | Actual value (in terms of parts by mass) | 0.13 | 0.12 | 0.14 |
|  |  | Ma/Mb (actual value basis) |  | 1415 | 1961 | 3125 |
|  |  | Ma/Mc (actual value basis) |  | 114 | 83 | 71 |
|  |  | Adhesion | Cu plate | 100/100 | 100/100 | 100/100 |
|  |  |  | Glass plate | 100/100 | 100/100 | 100/100 |
| Electrode | Active material | C/SiO (parts by mass) |  | 20 | 20 | 20 |
|  |  | Graphite (parts by mass) |  | 80 | 80 | 80 |
|  | Electrode amount (mg/cm$^2$) |  |  | 4.58 | 4.52 | 4.41 |
|  | Electrode density (g/cm$^3$) |  |  | 1.60 | 1.60 | 1.63 |
| Electric storage device | Discharge capacity retention rate (%) after 100 cycles |  |  | 94 | 92 | 93 |
|  | Active material layer thickness ratio (%) after charging |  |  | 114 | 118 | 117 |

Compositions and evaluation results (4/6)

|  |  |  |  | Example 10 | Example 11 | C.Example 1 |
|---|---|---|---|---|---|---|
| Slurry for electrode | Binder composition | Polymer (A) | Kind | P6 | P7 | P1 |
|  |  |  | Ma (parts by mass) | 10 | 10 | 10 |
|  |  | Water (B) | Charged amount (parts by mass) | 0.002 | 0.002 | 0.030 |
|  |  |  | Actual value (in terms of parts by mass) | 0.0032 | 0.0032 | 0.033 |
|  |  | Component (C) | Kind | C2 | C2 | — |
|  |  |  | Charged amount (parts by mass) | 0.1 | 0.1 | 0 |
|  |  |  | Actual value (in terms of parts by mass) | 0.14 | 0.14 | — |
|  |  | Ma/Mb (actual value basis) |  | 3125 | 3125 | 303 |
|  |  | Ma/Mc (actual value basis) |  | 71 | 71 | — |
|  |  | Adhesion | Cu plate | 100/100 | 100/100 | 86/100 |
|  |  |  | Glass plate | 100/100 | 100/100 | 92/100 |
| Electrode | Active material | C/SiO (parts by mass) |  | 25 | 25 | 20 |
|  |  | Graphite (parts by mass) |  | 75 | 75 | 80 |
|  | Electrode amount (mg/cm$^2$) |  |  | 4.44 | 4.42 | 4.88 |
|  | Electrode density (g/cm$^3$) |  |  | 1.63 | 1.61 | 1.61 |
| Electric storage device | Discharge capacity retention rate (%) after 100 cycles |  |  | 95 | 90 | 78 |
|  | Active material layer thickness ratio (%) after charging |  |  | 115 | 119 | 133 |

Compositions and evaluation results (5/6)

|  |  |  |  | C. Example 2 | C. Example 3 | C. Example 4 |
|---|---|---|---|---|---|---|
| Slurry for electrode | Binder composition | Polymer (A) | Kind | P2 | P1 | P1 |
|  |  |  | Ma (parts by mass) | 10 | 10 | 10 |

TABLE 1-continued

| | | | | | | |
|---|---|---|---|---|---|---|
| | | Water (B) | Charged amount (parts by mass) | 0 | 0 | 0.0008 |
| | | | Actual value (in terms of parts by mass) | ND | ND | 0.0006 |
| | | Component (C) | Kind | — | C5 | CP |
| | | | Charged amount (parts by mass) | 0 | 0.3 | 0.02 |
| | | | Actual value (in terms of parts by mass) | — | 0.29 | 0.02 |
| | | Ma/Mb (actual value basis) | | — | — | 16667 |
| | | Ma/Mc (actual value basis) | | — | 34 | 501 |
| | | Adhesion | Cu plate | 50/100 | 50/100 | 50/100 |
| | | | Glass plate | 50/100 | 50/100 | 50/100 |
| | Active material | C/SiO (parts by mass) | | 55 | 20 | 5 |
| | | Graphite (parts by mass) | | 45 | 80 | 95 |
| Electrode | | Electrode amount (mg/cm$^2$) | | 4.44 | 4.51 | 4.56 |
| | | Electrode density (g/cm$^3$) | | 1.63 | 1.62 | 1.66 |
| Electric storage device | | Discharge capacity retention rate (%) after 100 cycles | | 76 | 71 | 69 |
| | | Active material layer thickness ratio (%) after charging | | 151 | 138 | 132 |

| Compositions and evaluation results (6/6) | | | | | | |
|---|---|---|---|---|---|---|
| | | | | C. Example 5 | C. Example 6 | C. Example 7 |
| Slurry for electrode | Binder composition | Polymer (A) | Kind | P3 | P5 | UVA |
| | | | Ma (parts by mass) | 10 | 10 | 10 |
| | | Water (B) | Charged amount (parts by mass) | 0.0006 | 0.0005 | 0.0004 |
| | | | Actual value (in terms of parts by mass) | 0.0005 | 0.0006 | 0.0006 |
| | | Component (C) | Kind | C1 | C2 | C4-1 |
| | | | Charged amount (parts by mass) | 0.8 | 1.2 | 0.1 |
| | | | Actual value (in terms of parts by mass) | 0.74 | 1.07 | 0.10 |
| | | Ma/Mb (actual value basis) | | 20000 | 16667 | 16667 |
| | | Ma/Mc (actual value basis) | | 14 | 9 | 99 |
| | | Adhesion | Cu plate | 99/100 | 85/100 | 50/100 |
| | | | Glass plate | 100/100 | 80/100 | 50/100 |
| | Active material | C/SiO (parts by mass) | | 35 | 5 | 55 |
| | | Graphite (parts by mass) | | 65 | 95 | 45 |
| Electrode | | Electrode amount (mg/cm$^2$) | | 4.38 | 4.59 | 4.61 |
| | | Electrode density (g/cm$^3$) | | 1.59 | 1.60 | 1.62 |
| Electric storage device | | Discharge capacity retention rate (%) after 100 cycles | | 63 | 72 | 61 |
| | | Active material layer thickness ratio (%) after charging | | 142 | 135 | 153 |

Abbreviations shown in Table 1 refer to the following ingredients:

<Ingredient (A)>
UVA: U-Varnish A (trade name, manufactured by Ube Industries, Ltd., an NMP solution of polyamic acid)

<Ingredient (C)>
C1: acetic acid
C2: maleic acid
C3: citric acid
C4-1: pyromellitic acid
C4-2: 3,3',4,4'-benzophenonetetracarboxylic acid
C4-3: 3,3',4,4'-benzophenonetetracarboxylic dianhydride
C5: benzenepentacarboxylic acid
CP: polyacrylic acid (manufactured by Wako Pure Chemical Industries, Ltd., weight-average molecular weight Mw = 25,000)

<Active material>
C/SiO: graphite-coated silicon oxide prepared in Synthesis Example 6
Graphite: manufactured by Hitachi Chemical Co., Ltd., product name "SMG-HE1"
The term "ND" in the table means that the detection subject was not detected.

ADVANTAGEOUS EFFECTS OF INVENTION

The present invention provides a binder composition for an electrode that provides an electric storage device having a large charge/discharge capacity and reduced capacity degradation due to repetition of a charge/discharge cycle as much as possible.

Accordingly, the electric storage device produced using the binder composition for an electrode of the present invention has high capacity and long duration of life.

The invention claimed is:

1. A binder composition comprising:
   (A) at least one polymer selected from the group consisting of a polyamic acid and an imidized polymer of a polyamic acid having an imidization rate of 50% or less; and
   (B) water,
   wherein a ratio Ma/Mb of a mass of the polymer (A), Ma, to a mass of the water (B), Mb, is in a range of 500 to 5,000.

2. The binder composition of claim 1, further comprising (C) at least one compound selected from the group consisting of a compound having two or more carboxy groups and an anhydride of a compound having two or more carboxy groups.

3. The binder composition of claim 2, wherein a ratio Ma/Mc of the mass of the polymer (A), Ma, to a mass of the compound (C), Mc, is in a range of 50 to 400.

4. A slurry comprising:
   the binder composition of claim 1; and
   an electrode active material.

5. The slurry of claim 4, wherein the electrode active material comprises at least one selected from the group consisting of elemental silicon, a silicon oxide, and a silicon alloy.

6. An electric storage device having an electrode comprising:
   a current collector; and
   an active material layer disposed on the current collector, wherein the active material layer is formed from the slurry of claim 4.

7. An electric storage device having an electrode comprising:
   a current collector; and
   an active material layer disposed on the current collector, wherein the active material layer is formed from the slurry of claim 5.

8. The binder composition of claim 1, which is suitable for an electrode of an electric storage device.

9. The binder composition of claim 1, comprising (A) the polyamic acid.

10. The binder composition of claim 1, comprising (A) the imidized polymer of a polyamic acid.

11. The binder composition of claim 1, comprising (A) both the polyamic acid and the imidized polymer of a polyamic acid.

12. The binder composition of claim 2, comprising (C) the compound having two or more carboxy groups.

13. The binder composition of claim 2, comprising (C) the anhydride of a compound having two or more carboxy groups.

14. The binder composition of claim 2, comprising (C) both the compound having two or more carboxy groups and the anhydride of a compound having two or more carboxy groups.

15. The binder composition of claim 12, wherein a ratio Ma/Mc of the mass of the polymer (A), Ma, to a mass of the compound (C), Mc, is in a range of 50 to 400.

16. The binder composition of claim 13, wherein a ratio Ma/Mc of the mass of the polymer (A), Ma, to a mass of the compound (C), Mc, is in a range of 50 to 400.

17. The binder composition of claim 14, wherein a ratio Ma/Mc of the mass of the polymer (A), Ma, to a mass of the compound (C), Mc, is in a range of 50 to 400.

18. The slurry of claim 4, wherein the electrode active material comprises elemental silicon.

19. The slurry of claim 4, wherein the electrode active material comprises a silicon oxide.

20. The slurry of claim 4, wherein the electrode active material comprises a silicon alloy.

21. The binder composition of claim 1,
   wherein a ratio Ma/Mb of a mass of the polymer (A), Ma, to a mass of the water (B), Mb, is in a range of 1,000 to 5,000.

22. The binder composition of claim 1,
   wherein a ratio Ma/Mb of a mass of the polymer (A), Ma, to a mass of the water (B), Mb, is in a range of 1,300 to 3,500.

23. The binder composition of claim 1,
   wherein a ratio Ma/Mb of a mass of the polymer (A), Ma, to a mass of the water (B), Mb, is in a range of 2,222 to 4,762.

* * * * *